(12) United States Patent
Tamai et al.

(10) Patent No.: US 6,466,748 B2
(45) Date of Patent: Oct. 15, 2002

(54) IMAGE PROCESSING APPARATUS WITH PROGRAMMABLE SELECTION OF ABNORMAL CONDITION HANDLING

(75) Inventors: Yoshiyuki Tamai; Masahiro Imamura, both of Toyokawa; Toshihisa Motosugi, Okazaki; Eiichi Yoshida; Syuji Maruta, both of Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/793,144

(22) Filed: Feb. 27, 2001

(65) Prior Publication Data
US 2001/0017989 A1 Aug. 30, 2001

(30) Foreign Application Priority Data
Feb. 29, 2000 (JP) ......................................... 2000-054984

(51) Int. Cl.$^7$ .............................................. G03G 15/00
(52) U.S. Cl. ............................... 399/16; 399/18; 399/87
(58) Field of Search ............................. 399/8, 9, 16, 18, 399/42, 75, 81, 85, 87, 391; 358/401; 395/113

(56) References Cited

U.S. PATENT DOCUMENTS

| | | | | |
|---|---|---|---|---|
| 4,905,098 A | * | 2/1990 | Sakata | 358/468 |
| 5,168,316 A | * | 12/1992 | Hino et al. | 399/23 |
| 5,229,814 A | * | 7/1993 | Hube et al. | 399/14 |
| 5,966,555 A | * | 10/1999 | Nakajima et al. | 399/18 |

* cited by examiner

*Primary Examiner*—Sophia S. Chen
*Assistant Examiner*—Hoan Tran
(74) *Attorney, Agent, or Firm*—Burns, Doane, Swecker & Mathis, LLP

(57) ABSTRACT

In an image processing apparatus, a predetermined processing is performed in response to occurrence of an abnormal condition that an image forming job cannot be executed. A first processing is preset for the apparatus as a common processing to respond to the abnormal condition. A second processing is set for the image forming job as a processing to respond to the abnormal condition. Either the first processing or the second processing is selected according to priorities assigned thereto. The selected processing is performed in response to occurrence of the abnormal condition when the abnormal condition occurs. The processing to handle the abnormal condition can flexibly be selected from among a plurality of processings according to the environment in which the printer system is placed.

19 Claims, 9 Drawing Sheets

IMAGE PROCESSING APPARATUS WITH PROGRAMMABLE SELECTION OF ABNORMAL CONDITION HANDLING

CROSS-REFERENCE TO RELATED APPLICATIONS

This application is based on application No. 2000-54984 filed in Japan, the contents of which are hereby incorporated by reference.

BACKGROUND OF THE INVENTION

1. Field of the Invention

The present invention relates to an image processing apparatus that performs image processing in response to a request for an image forming job, and more particularly, to a technology to select, when an abnormal condition occurs that an image forming operation corresponding to an accepted image forming job cannot be performed, the processing to be performed thereafter from among a plurality of processings.

2. Description of the Related Art

In recent years, many companies have been using, as image forming apparatuses, printer systems comprising a plurality of terminals such as personal computers on which a word processing software program, an image processing software program and the like are installed, and a printer that receives requests for print jobs from the terminals through a network to perform printing. The efficiency of work is increased by the terminals sharing one printer.

The printer performs printing in the order in which the print job requests from terminals are made. For example, when paper of the specified size is not set, the printing cannot be performed. For such a case, conventionally, a method that the printer waits, without accepting any print job requests from other users, until paper of the specified size is set is fixedly set in advance as the processing to be performed thereafter.

However, only by fixedly using the method, the case where paper of the specified size is not set cannot flexibly be handled according to the use environment of the printer, so that the printer system is poor in usability.

For example, when the use environment is such that it is desirable for the printer to be stopped as rarely as possible because the printer is connected a large-scale network and print job requests are frequently made, the users other than the user requesting the print job are inconvenienced because they have to wait until the paper is set.

On the other hand, when the use environment is such that the printer is shared by a small number of users and not so many print job requests are made, it is not very inconvenient to the other users if the printer is stopped, and convenience is afforded to the user requesting the print job because he can perform printing in preference to the other users when the paper is set.

As described above, conventionally, when an abnormal condition that a print job cannot be executed occurs, the method to handle the case is merely fixedly set, so that various use environments cannot flexibly be dealt with. As a result, the interests of the user requesting the print job and the other users cannot appropriately be coordinated.

This problem can arise when a processing method (control method) to handle the abnormal condition that printing cannot be performed is fixedly set.

OBJECTS AND SUMMARY

The present invention is made in view of the above-mentioned problem, and an object thereof is to provide an image processing apparatus in which by enabling flexibly handling to be performed according to the use environment, when an abnormal condition that printing cannot be performed occurs, the interests of a user requesting a print job and the other users are coordinated to enable smooth printing.

To achieve the above-mentioned object, according to a first aspect of the present invention, an image processing apparatus that performs a predetermined processing in response to occurrence of an abnormal condition that an image forming job cannot be executed is provided with: first setting unit for presetting a first processing for the apparatus as a common processing to respond to the abnormal condition; second setting unit for setting a second processing for the image forming job as a processing to respond to the abnormal condition; and priority assigning unit for assigning priorities to the first processing and the second processing.

According to a second aspect of the present invention, an image forming apparatus that performs a predetermined processing in response to occurrence of an abnormal condition that an image forming job cannot be executed is provided with: first setting unit for setting a first processing for a first image forming job as a processing to respond to the abnormal condition; second setting unit for setting a second processing different from the first processing for a second image forming job as a processing to respond to the abnormal condition; and a controller for performing the first processing when the abnormal condition occurs with respect to the first image forming job, and performing the second processing when the abnormal condition occurs with respect to the second image forming job.

According to a third aspect of the present invention, a method of controlling an image forming apparatus that performs a predetermined processing in response to occurrence of an abnormal condition that an image forming job cannot be executed is provided with the steps of: presetting a first processing for the apparatus as a common processing to respond to the abnormal condition; setting a second processing for the image forming job as a processing to respond to the abnormal condition; selecting either the first processing or the second processing according to priorities assigned thereto; and performing the selected processing in response to occurrence of the abnormal condition when the abnormal condition occurs.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Hereinafter, an embodiment where the image processing apparatus according to the present invention is applied to a printer system will be described with reference to the drawings.

(1) Structure of the Printer System

Figure 1:
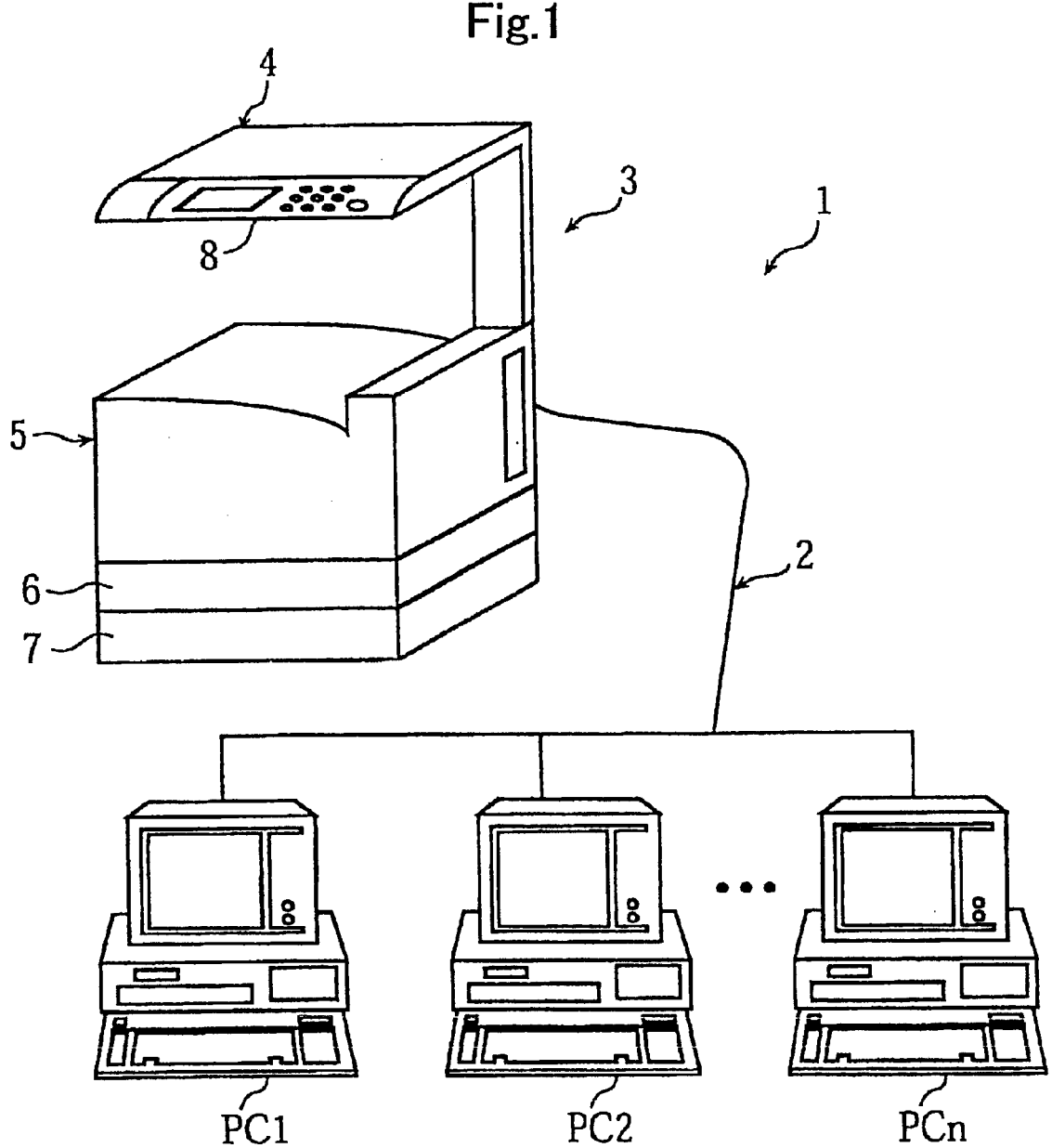
FIG. 1 is a view showing the structure of a printer system to which the present invention is applied.

FIG. 1 is a view showing the general structure of the printer system 1.

As shown in the figure, the printer system 1 has a local-area network (LAN) 2, a plurality of terminals PC1 to PCn connected to the LAN 2, and a printer 3.

The terminals PC1 to PCn each comprise a personal computer main unit having a hard disk and the like, and a monitor, a keyboard and the like connected to the personal computer main unit. On the hard disk, an operating system (OS) supporting the network, a printer driver, an application software program for word processing and the like are preinstalled.

When a document or the like created by use of an application software program is printed on the printer 3, image data such as document data (print data), information on the size of the paper on which the image data is to be printed (paper size information) and handling processing selection information described later are sent to the printer 3 through the LAN 2.

The handling processing is the processing (control) performed, when an abnormal condition that printing cannot be performed occurs, to handle the abnormal condition after its occurrence.

The printer 3 comprises a scanner portion 4 for reading the image of the original, and a printer portion 5 for performing image formation based on the image of the original read by the scanner portion 4 and the print data sent from the terminals PC1 to PCn through the LAN 2.

The scanner portion 4 is a known one that reads the image of the original with a charge-coupled device (CCD) image sensor 41 (see FIG. 2) to obtain electric signals. The signals are converted into image data by a controller 100 (see FIG. 2) of the printer 3.

The printer portion 5 forms images on paper by a known electrophotographic method, and has a paper feed cassette 6 holding A4-size paper and a paper feed cassette 7 holding B4-size paper.

For example, when image formation is performed on A4-size paper, paper in the paper feed cassette 6 is transported to a transfer position, and a laser beam is emitted from a laser diode (LD) 51 (see FIG. 2) in correspondence with the image data to perform scanning on the surface of a photoconductor drum while exposing it, thereby forming an electrostatic latent image. The electrostatic latent image is developed with toner into a toner image, and the toner image on the photoconductor drum is transferred onto the paper at the transfer position and fixed. Then, the paper is discharged. The paper feed cassettes 6 and 7 are each provided with a paper detection sensor (not shown) for detecting the presence or absence of paper. The detection signal from the sensor is sent to the controller 100. Based on the detection signal, the controller 100 determines whether paper is set in the paper feed cassettes 6 and 7 or not.

An operation panel 8 is provided in an easy-to-operate position on the front surface of the scanner portion 4. The operation panel 8 has a start key 81 (see FIG. 4) for providing an instruction to start printing, a numeric keypad 82 (see FIG. 4) for setting the number of copies and the like, and a display portion 83 (see FIG. 4). The display portion 83 comprises a touch panel. On the display portion 83 are displayed various messages for the operator such as a message indicating whether printing is possible or not and a message to warn that paper has run out in the paper feed cassette 6 or 7, the number of copies set by the user, and the like. Operations such as selection of the cassette 6 or 7 to be used and selection of common-to-system handling processing described later can be performed in accordance with a menu screen.

(2) Structure of the Controller 100

Figure 2:
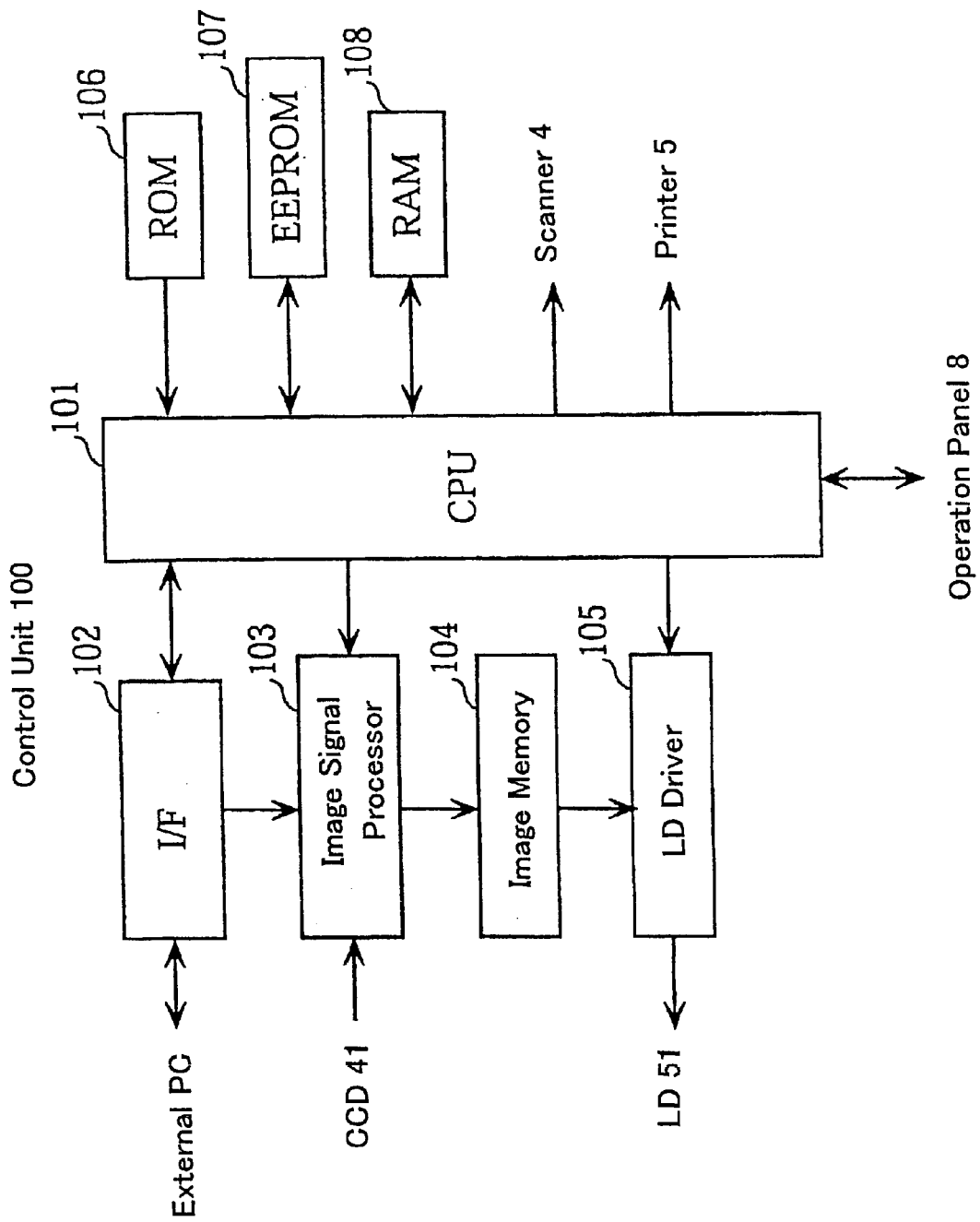
FIG. 2 is a view showing the structure of a controller provided in a printer of the printer system.

FIG. 2 shows the structure of the controller 100 provided in the printer 3.

As shown in the figure, the controller 100 comprises a central processing unit (CPU) 101, an interface (I/F) 102, an image signal processor 103, an image memory 104, an LD driver 105, a read-only memory (ROM) 106, an electrically erasable programmable ROM (EEPROM) 107 and a random-access memory (RAM) 108.

The I/F 102 is provided for connection to the LAN 2. The I/F 102 receives the print data sent from the terminals PC1 to PCn through the LAN 2 and sends the received data to the image signal processor 103. The I/F 102 also sends to the CPU 101 the handling processing selection information and the like sent together with the print data. Information on messages dispatched from the CPU 101 to the users operating the terminals are sent through the LAN 2 to the terminals.

The image signal processor 103 generates image data by performing correction such as the known shading correction or gamma correction on the electric signals sent from the CCD image sensor 41 of the scanner portion 4 and the print data sent through the I/F 102. The generated image data is stored in the image memory 104.

The LD driver 105 reads the corrected image data from the image memory 104 in response to an instruction from the CPU 101, and drives the LD 51 based on the image data so as to emit a laser beam.

In the ROM 106 are stored programs such as a control program related to an image reading operation by the scanner portion 4 and an image forming operation by the printer portion 5 and a control program related to handling processing selection processing described later.

In the EEPROM 107 are stored information set as the common-to-system handling processing described later and information on the priorities assigned to the handling processings.

In the RAM 108, a determination flag described later and the content of the handling processing selection information are temporarily stored in a management table.

The CPU 101 reads a necessary program from the ROM 106 and controls the scanner portion 4 and the printer portion 5 to perform smooth printing. The CPU 101 also performs the handling processing selection processing. Further, the CPU 101 accepts entries from various keys of the operation panel 8, and displays on the display portion 83 of the operation panel 8 necessary contents such as a message to warn that paper has run out in the paper feed cassette 6 or 7.

Receiving the handling processing selection information sent together with the print data from the terminals PC1 to PCn, the CPU 101 stores the content of the information in the management table in the RAM 108 so as to be associated with the address of the image memory 104 at which the image data is stored. The CPU 1 obtains a determination as to whether the image data to be printed is accompanied with the handling processing selection information or not and the setting content thereof by referring to the management table.

A determination flag for determining whether the image data is data generated by a reading operation by the scanner portion 4 or data sent from the terminals PC1 to PCn is stored in the management table so as to be associated with the storage address. Then, whether the image data is data read by the scanner portion 4 or data sent from the terminals PC1 to PCn is determined by referring to the determination flag.

(3) Overall Control Operation of the Printer

Figure 3:
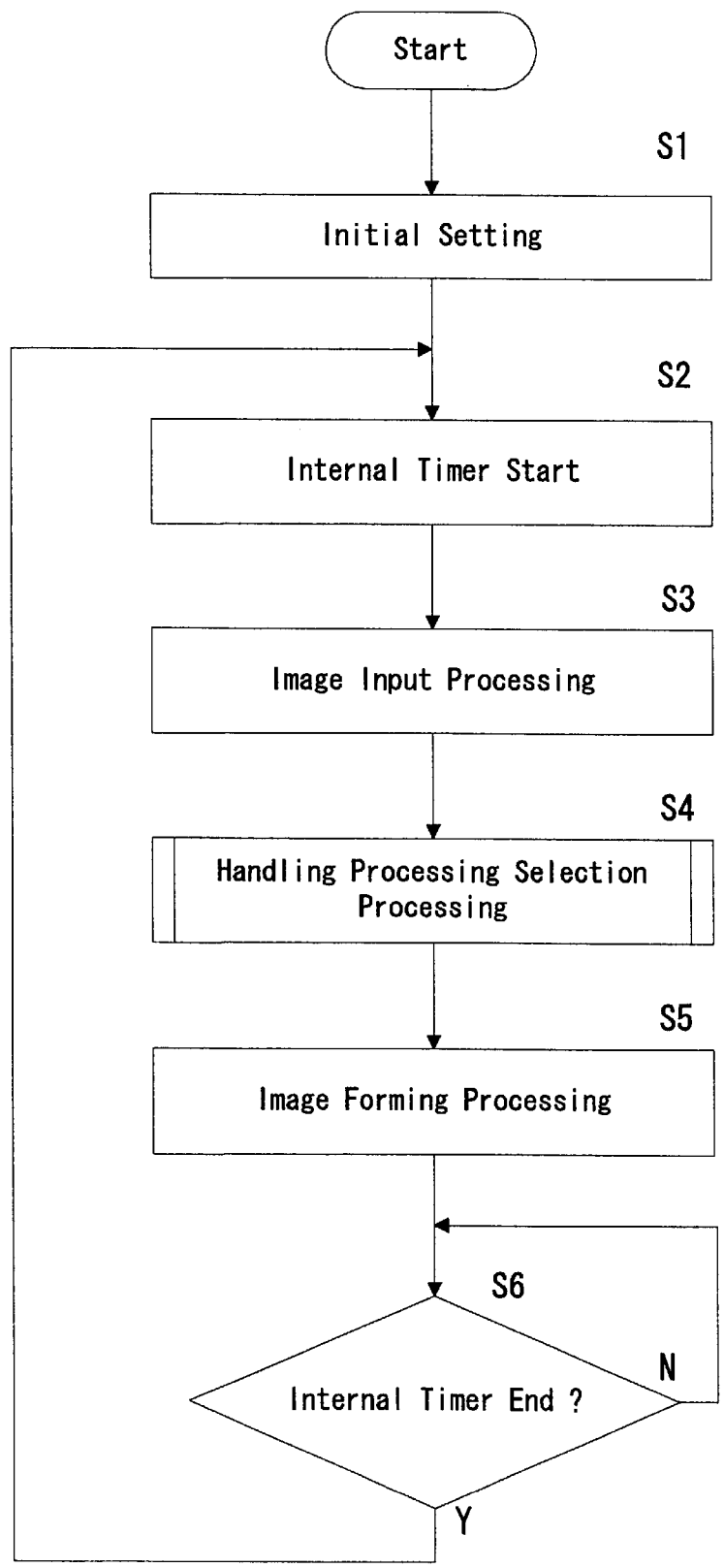
FIG. 3 is a flowchart showing the main routine of an overall control operation of the printer.

FIG. 3 is a flowchart showing the main routine of an overall control operation of the printer performed by the CPU 101.

When the printer is turned on, first, initial setting for clearing the contents of the RAM 108 and initializing various registers is performed (step S1), and an internal timer is started at step S2. The processing time of one routine of the main routine is set by the internal timer.

Then, image input processing is performed (step S3). In the image input processing, the image of the original is read by the scanner portion 4 or the print data and the like sent from the terminals PC1 to PCn are accepted. The image data is stored into the image memory 104.

Then, the process proceeds to the handling processing selection processing (step S4). In the handling processing selection processing, in a case where an abnormal condition that the required processing cannot be performed occurs, for example, in a case where a print job to perform printing using A4-size paper is requested by a terminal when no A4-size paper is set in the paper feed cassette 6, one processing is selected from among a plurality of processings prepared for handling this condition (hereinafter, referred to as "handling processings"). That is, when an abnormal condition occurs, the processing (control) to be performed thereafter is selected from among a plurality of processings. When no abnormal condition occurs in the printer 3, the processing proceeds directly to the image forming processing at step S5, and the image data to be formed into an image is read from the image memory 104 and the image forming operation is performed.

When an abnormal condition occurs, the processing to handle the abnormal condition is selected. After executing the selected processing, the process proceeds to the image forming processing at step S5. Then, after waiting until the internal timer ends, the process returns to step S2 (step S6).

(4) Control Operation of the Handling Processing Selection Processing

In describing the control operation of the handling processing selection processing, first, the contents that the manager of the printer system 1 should preset and the contents that the user requesting a print job should set will be described as preconditions for executing the handling processing selection processing. In this description, a case where paper of the specified size is not set is taken as an example of the "abnormal condition."

(4-1) Contents to be Preset by the Manager

The manager first selects a processing considered to be performed in principle for all the requested print jobs (hereinafter, referred to as "common-to-system handling processing") from among the following four handling processings prepared for handling the case where paper of the specified size is not set:

1. Continue printing;
2. Continue printing after a timeout;
3. Wait until paper of the specified size is set; and
4. Ask the user.

Figure 4:
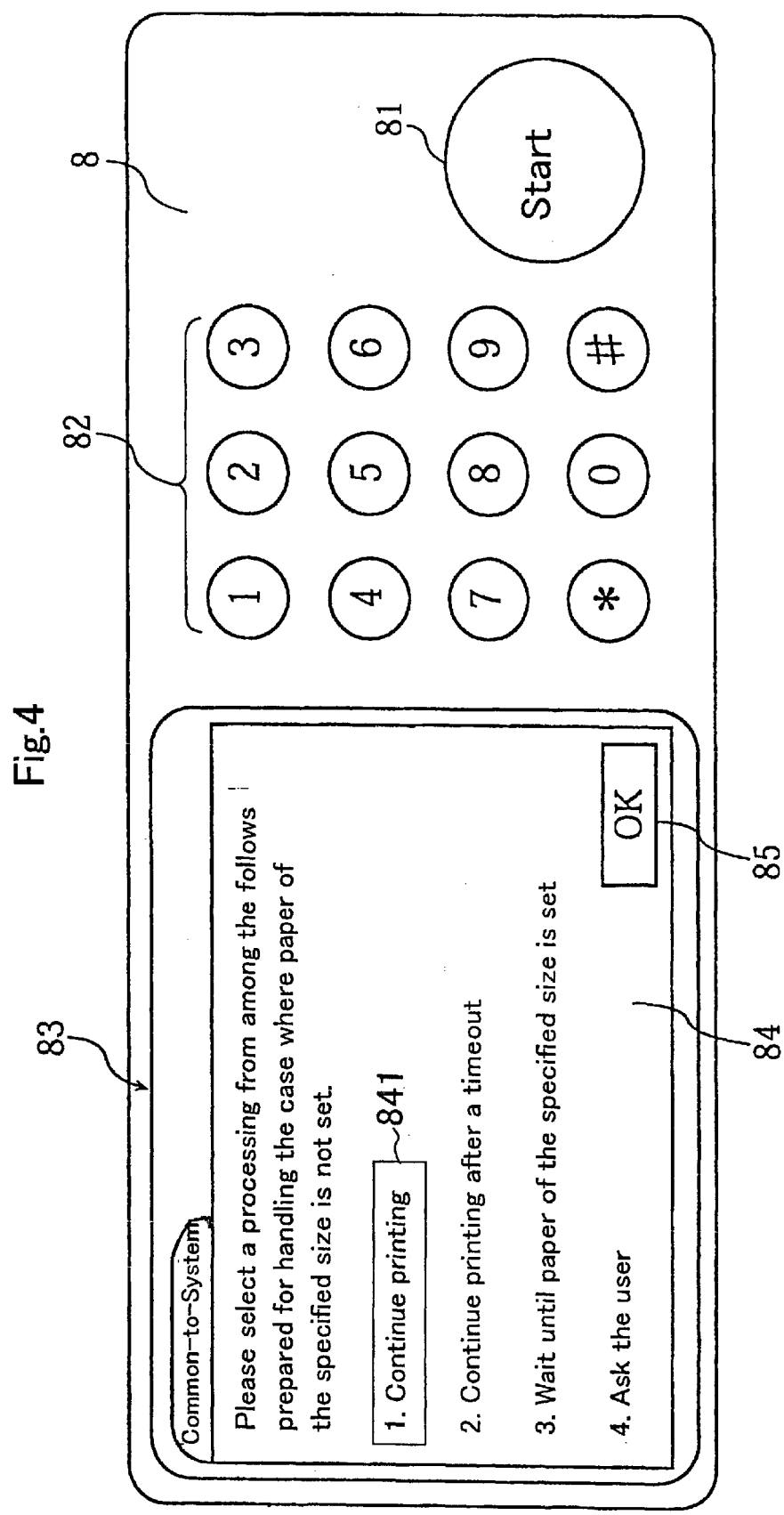
FIG. 4 is a view showing an example of an acceptance screen for selecting a common-to-system handling processing to be performed when paper of a specified size is not set.

FIG. 4 is a view showing an example of an acceptance screen 84 for selecting the common-to-system handling processing on the display portion 83 of the operation panel 8.

The display portion 83 comprises a touch panel as mentioned above, and one processing can be selected by touching with a finger the part of the acceptance screen 84 where the processing is displayed. The selection operation is ended by touching an OK button 85. While the criterion on which the common-to-system processing is selected will be mentioned later, the content of each processing will be described below.

In "1. Continue printing", when B4-size paper is set although no A4-size paper is set, printing is continuously performed on the B4-size paper.

In "2. Continue printing after a timeout", after a predetermined time has elapsed since a message that paper of the specified size is not set was sent to the terminal of the user requesting the print job to notify him, printing is continuously performed on paper of a different size. When A4-size paper is set within the predetermined time, for example, 20 seconds, printing is performed on the set paper. When the predetermined time has elapsed without the paper being set, however, printing is forcibly performed on B4-size paper. In this processing, until the predetermined time elapses, the printer system 1 is held in a wait state where print job requests from the other users are not accepted.

In "3. Wait until paper of the specified size is set", the printer system 1 is held in the wait state until paper of the specified size (A4 size) is set. The print job is resumed when paper of the specified size is set.

In "4. Ask the user", how to handle the abnormal condition is left to the user's judgment. A message that paper of A4 size is not set is sent to the terminal of the user requesting the print job, and the printer system 1 is held in the wait state, for example, until the user cancels the print job that he requested or sets paper of the specified size.

The acceptance screen 84 is displayed only when a password predetermined by the manager is entered. The selected processing is enclosed with an outer frame 841 so that the selected processing can be confirmed.

Further, the manager assigns priorities to the handling processings.

Figure 5:
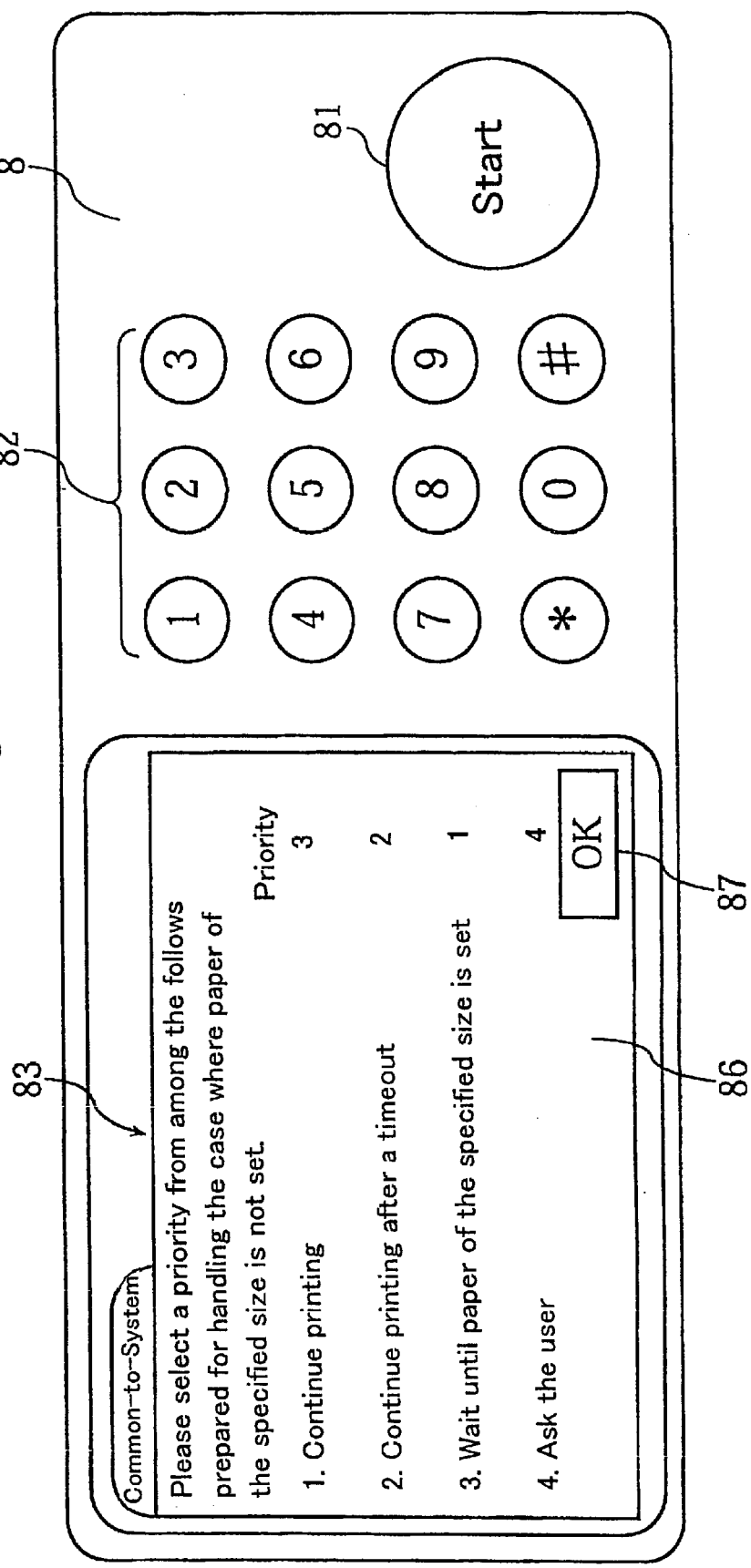
FIG. 5 is a view showing an example of an acceptance screen for assigning priorities to handling processings on an operation panel.

FIG. 5 is a view showing an example of an acceptance screen 86 for assigning priorities to the handling processings on the operation panel 8. The manager enters a predetermined password so that the acceptance screen 86 is displayed like the case of the acceptance screen 84, selects each processing by touching with a finger the part where the processing is displayed, and then, assigns a priority to the processing by entering the number to be set as the priority from the numeric keypad 82.

In FIG. 5, "3. Wait until paper of the specified size is set" has the highest priority, followed by "2. Continue printing after a timeout", "1. Continue printing" and "4. Ask the user" in this order. After finishing the priority assignment, the manager touches the OK button 85 to end the setting operation.

The criterion of the priority assignment will be described later. The processing set as the common-to-system processing and the content of the priorities assigned on the acceptance screen 86 are both stored in the EEPROM 107.

(4-2) Contents to be Set by the User Requesting the Print Job

Figure 6:
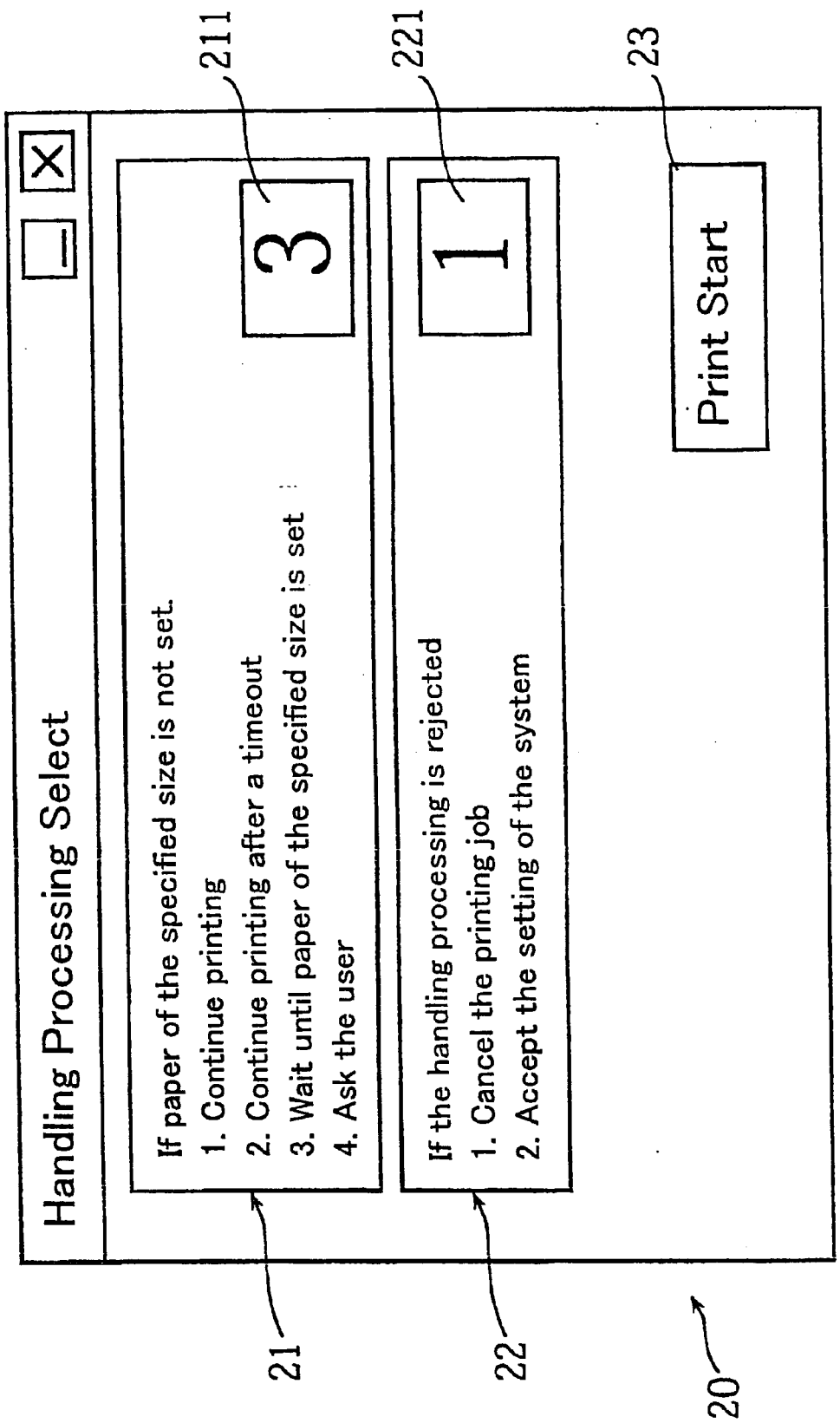
FIG. 6 is a view showing an example of an acceptance screen displayed on the monitor of each terminal in the printer system.

FIG. 6 is a view showing an example of an acceptance screen 20 for the user to set handling processing selection information on the monitor of each of the terminals PC1 to PC3. The user selects a desired processing as the user desired handling processing from among the four handling processings displayed on the acceptance screen 20. When the handling processing selected by the user is not adopted (is rejected) in the handling processing selection processing described later, that is, when the user desired handling processing is not adopted, the user determines whether to cancel the print job or accept the setting of the system (the common-to-system handling processing selected by the manager).

The acceptance screen 20 is displayed every print job request as the last item to be set before printing is executed, after the user requesting the print job calls up the printing screen of the OS or an application software program on a terminal and performs selection of the paper size, setting of the number of copies and the like. When a print start button 23 is clicked with a mouse or the like, the print job is requested of the printer 3.

Figure 7:
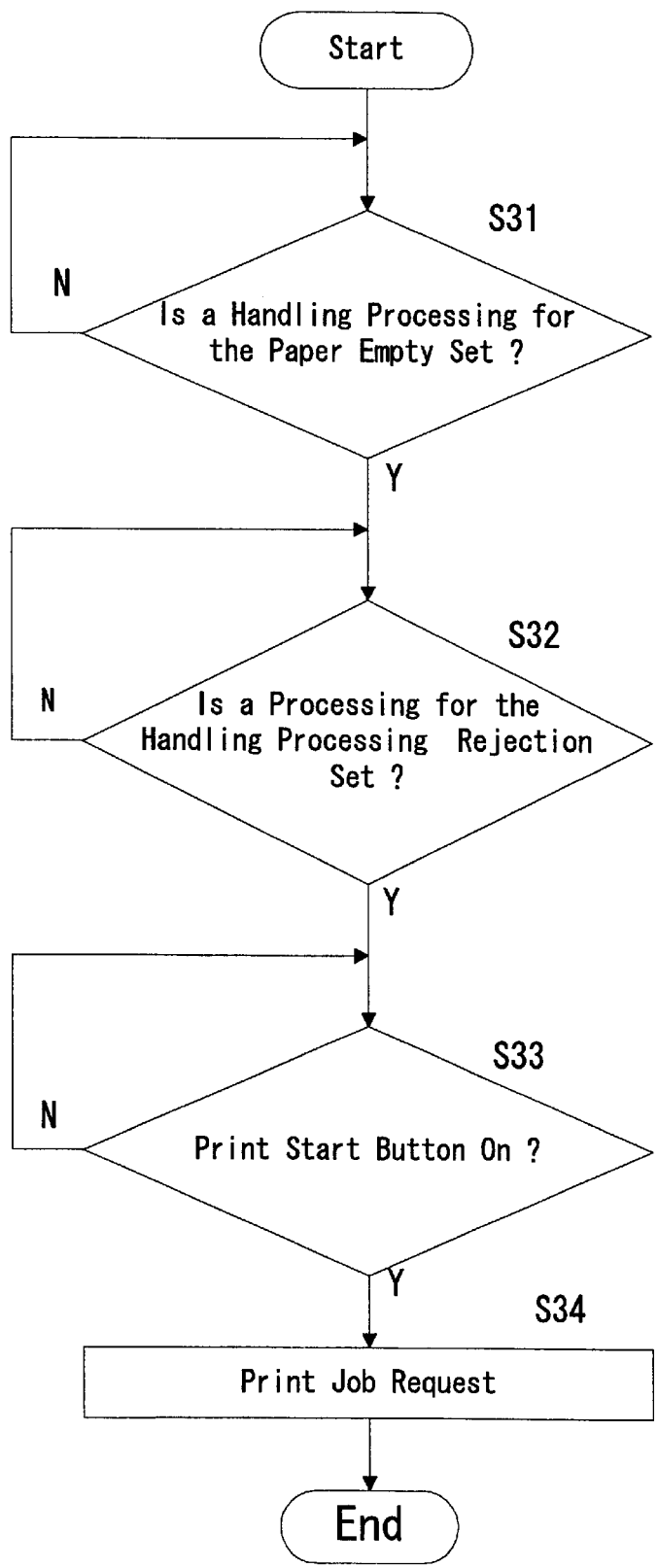
FIG. 7 is a flowchart showing the content of handling processing selection information setting processing performed by the user on the acceptance screen of a terminal.

FIG. 7 is a flowchart showing the content of the handling processing selection information setting processing performed by a controller of each of the terminals PC1 to PC3.

First, with the acceptance screen 20 displayed on the monitor of the terminal, it is determined whether or not one of the processings is selected as the processing to handle the case where paper of the specified size is not set (step S31). This is determined based on whether or not the number assigned to a handling processing is entered in an entry box 211 in a handling processing selection portion 21 of the acceptance screen 20 shown in FIG. 6 by use of a numeric key on the keyboard of the terminal. When it is determined that the number is entered in the entry box 211 ("Y" of step S31), whether the processing to be performed when the selected handling processing is rejected is selected or not is determined (step S32). This is determined based on whether or not the number corresponding to the processing to be performed when the selected handling processing is rejected is entered in an entry box 221 in a job cancel selection portion 22 shown in FIG. 6 by use of a numeric key on the keyboard. When it is determined that the number is entered in the entry box 221 ("Y" of step S32), whether the print start button 23 shown in FIG. 6 is clicked or not is determined (step S33). When it is determined that the button 23 is clicked, the print job is requested (step S34). Consequently, print data, information such as the paper size information and the contents set as the handling processing selection information at steps S31 and S32 are sent to the printer 3 through the LAN 2.

The above-described handling processing selection information setting processing can be performed every time a print job is requested. Therefore, a different handling processing can be set for each print job.

While a case has been described where the handling processing selection information is set on the acceptance screen 20 displayed on the monitor of each terminal, the handling processing selection information can be set also when the image data of an original is read by use of the scanner portion 4 of the printer 3 and printed. That is, when the user depresses the start key 81 with an original set in the scanner portion 4, a print job is requested, so that reading of the image of the original is started and a screen (not shown) similar to the acceptance screen 20 is displayed on the display portion 83 of the operation panel 8. The user selects the desired handling processing and the processing content for the case where the desired handling processing is rejected. When the print start button 23 is clicked after the selection, printing is started, and the selected contents are sent to the CPU 101 as the handling processing selection information. The CPU 101 stores the contents in the management table in the RAM 108 so as to be associated with the address of the image memory 104 at which the image data is stored like in the case where handling processing selection information is received from the terminals PC1 to PCn.

(4-3) Control Operation of the Handling Processing Selection Processing

Figure 8:
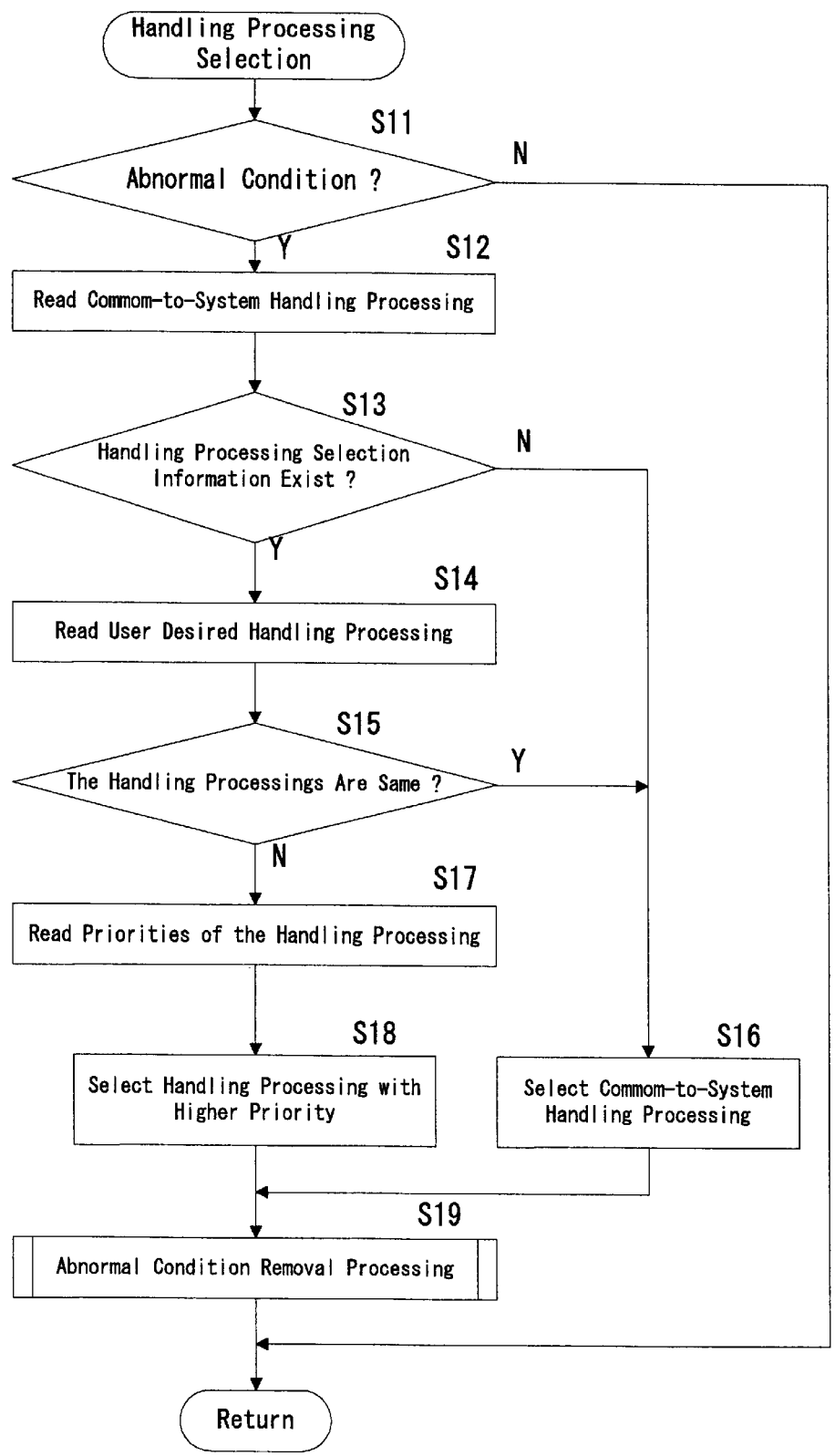
FIG. 8 is a flowchart showing the content of a subroutine of handling processing selection processing.

FIG. 8 is a flowchart showing the content of the subroutine of the handling processing selection processing of FIG. 3.

First, the CPU 101 determines whether an abnormal condition (condition that the requested print job cannot be executed) occurs or not (step S11). This is determined based on whether or not A4-size paper is set in the paper feed cassette 6 when the print job is requested. This determination is made based on a detection signal sent from the detection sensor disposed in the paper feed cassette 6 to the controller 100.

When it is determined that the abnormal condition occurs ("Y" of step S11), the common-to-system handling processing stored in the EEPROM 107 in the controller 100 is read out (step S12). This processing is the handling processing selected by the manager on the acceptance screen 84 of FIG. 4.

Then, whether the image data to be printed is accompanied with handling processing selection information or not is determined (step S13). This determination can be made by referring to the management table in the RAM 108. When it is determined that handling processing selection information accompanies, referring to the handling processing selection information stored in the management table, the CPU 101 reads the handling processing selected as the user desired handling processing (the processing selected by the user on the handling processing selection portion 21 shown in FIG. 6, or when the image of the original is read by the scanner portion 4, the processing selected on the display portion 83 of the operation panel 8) (step S14).

Then, whether the handling processings read at steps S12 and S14 are the same or not is determined (step S15). When it is determined that the handling processings are the same, the processing (common-to-system handling processing) is chosen as the processing to handle the abnormal condition (step S16), and the process proceeds to the abnormal condition removal processing of step S19.

When it is determined at step S13 that no handling processing selection information accompanies, the process proceeds to step S16. This is a case where since no handling processing selection information is sent when a terminal that cannot perform the "handling processing selection processing" is connected to the LAN 2, the common-to-system handling processing is selected as the processing to handle the abnormal condition.

When it is determined that the handling processings are not the same ("N" of step S15), the priorities assigned to the handling processings are read with reference to the content of the priorities assigned to the handling processings stored in the EEPROM 107 in the controller 100 (step S17). The priorities are the ones assigned by the manager on the acceptance screen 86 shown in FIG. 7.

Then, the priorities assigned to the handling processings are compared, and the processing having the higher priority is chosen as the processing to handle the abnormal condition (step S18). Then, the process proceeds to the abnormal condition removal processing of step S19.

For example, when "3. Wait until paper of the specified size is set" is selected as the user desired handling processing and "1. Continue printing" is selected as the common-to-system handling processing, since the handling processings are not the same, the priorities assigned to these processings are referred to, and the processing having the higher priority, in this example, "3. Wait until paper of the specified size is set" desired by the user is chosen.

Therefore, for example, when the printer system 1 is in an environment such that it is connected to a large-scale network, a large number of people share one printer and it is desirable for the printer to be stopped as rarely as possible because each user frequently requests a print job (hereinafter, referred to as "system priority environment"), the manager selects "1. Continue printing" as the common-to-system handling processing and assigns the highest priority to this handling processing. Then, even though a user intending printing on A4-size paper selects "3. Wait until paper of the specified size is set", since "3. Wait until paper of the specified size is set" has a lower priority than "1. Continue printing", "1. Continue printing" desired by the manager is chosen as the processing to handle the abnormal condition.

Although this is inconvenient to the user requesting the print job, the manager's intention is reflected, and convenience is increased for a majority of the other users sharing the printer 3.

While the processing desired by the user requesting the print job is rejected in this case, when "1. Cancel job" is selected by the user on the job cancel selection portion 22 shown in FIG. 6, the print job itself is canceled as described later. Therefore, printing on paper of a size different from the desired one is not performed in actuality. Consequently, prints of no use are never produced, and processing contrary to the user's intention is never performed.

Moreover, it is considered to select "1. Continue printing" as the common-to-system handling processing and assign the highest priority to "3. Wait until paper of the specified size is set." By doing this, when the user selects "3. Wait until paper of the specified size is set" as the user desired handling processing, "3. Wait until paper of the specified size is set" is chosen as the handling processing. Therefore, a user requesting a print job normally selects "1. Continue printing" as the user desired handling processing in order not to cause inconvenience to the other users, and selects "3. Wait until paper of the specified size is set" in a case where the user wants to perform printing on paper of the specified size although it is inconvenient to the other users such as in an emergency. By doing this, the interests of the user requesting the print job and the other users are coordinated.

When the printer system 1 is in an environment such that the printer 3 is shared by a small number of users, the number of print jobs requested by the users is comparatively small and the printer can be stopped (hereinafter, referred to as "user priority environment"), the manager selects "3. Wait until paper of the specified size is set" as the common-to-system handling processing and assigns the highest priority to this handling processing. Then, "3. Wait until paper of the specified size is set" is finally chosen as the processing to handle the abnormal condition, which is advantageous to the user requesting the print job.

In this environment, it is considered to assign the lowest priority to "3. Wait until paper of the specified size is set". By doing this, when the user considers that printing may be performed on paper of any size such as when the user intends to perform test printing, by selecting "1. Continue printing" as the user desired handling processing, the priority assigned to this processing is higher, so that "1. Continue printing" is finally chosen as the handling processing. Therefore, when no A4-size paper is set, printing is automatically performed on B4-size paper, so that the user's intention to perform test processing is reflected.

In an environment intermediate between the system priority environment and the user priority environment, it is considered to select "1. Continue printing" or "2. Continue printing after a timeout" as the common-to-system handling processing and assign a high priority to "3. Wait until paper of the specified size is set" or "4. Ask the user". By doing this, the user's intention is comparatively largely reflected. By making a setting opposite to this, the other users' intention is largely reflected.

As described above, by changing the common-to-system handling processing and the content of the assigned priorities according to the environment in which the printer system 1 is placed, emphasis can be placed on the user s or the manager s (the other users') intention, or the intentions of both can be reflected as largely as possible. The conventional problem never arises that the interests of the user requesting the print job and the other users cannot be coordinated and the intention of one of them is ignored because the handling method is fixedly set.

Figure 9:
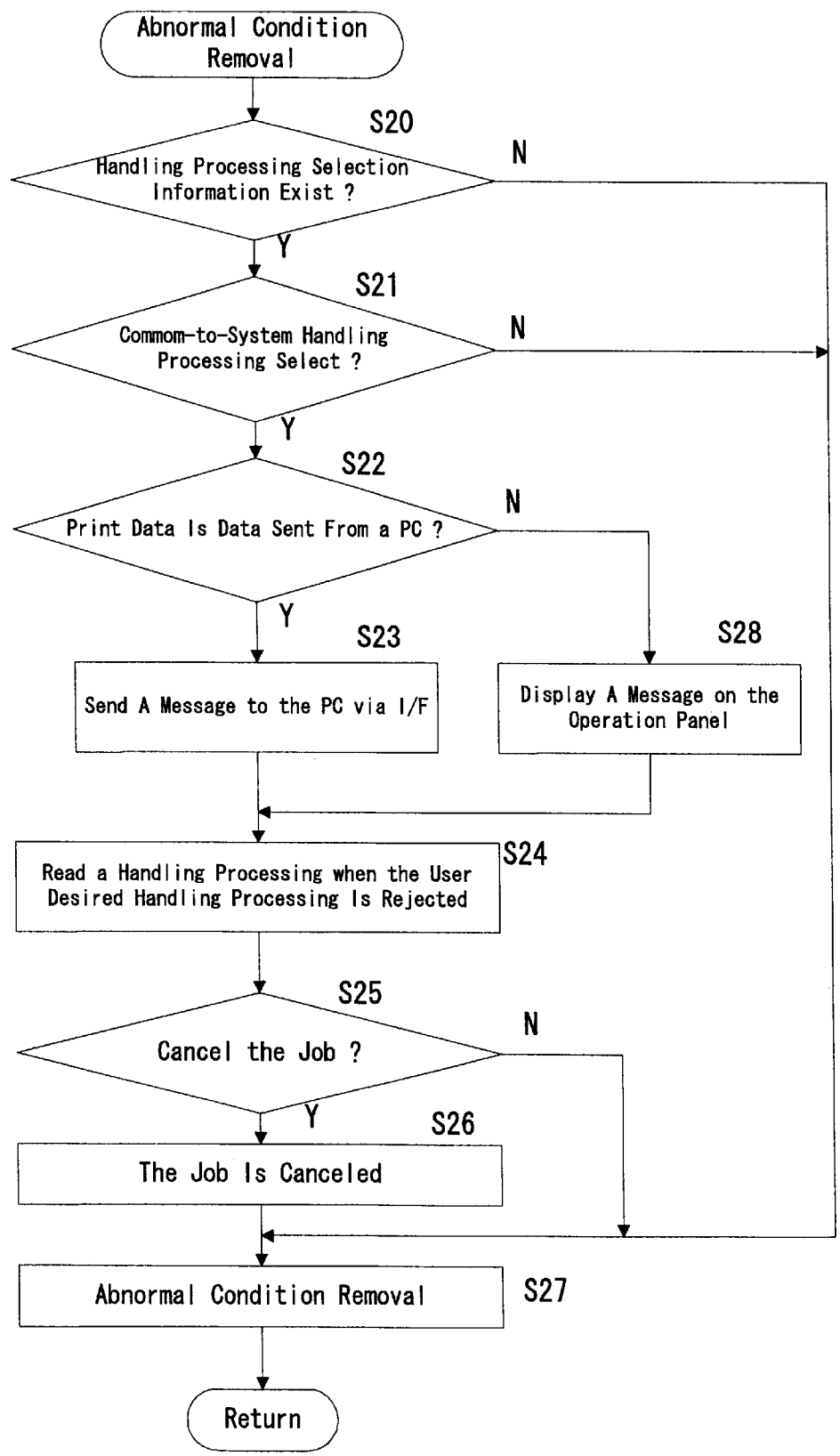
FIG. 9 is a flowchart showing the content of a subroutine of abnormal condition removal processing.

FIG. 9 is a flowchart showing the content of the subroutine of the abnormal condition removal processing of step S19 shown in FIG. 8. In this subroutine, when an abnormal condition occurs, the chosen handling processing is performed so that the abnormal condition is removed (the printer system 1 recovers from the abnormal condition.

First, the CPU 101 determines whether the image data to be printed is accompanied with handling processing selection information or not (step S20). This determination can be made by referring to the management table in the RAM 108. When it is determined that the information accompanies ("Y" of step S20), whether the common-to-system handling processing is adopted or not is determined (step S21). This can be determined based on whether the handling processing selected at step S18 is the common-to-system handling processing or not. When it is determined that the common-to-system handling processing is adopted ("Y" of step S21), whether the image data to be printed is data sent from a terminal or not is determined (step S22). This determination can be made by referring to the determination flag stored in the RAM 108. When it is determined that the image data is data sent from one of the terminals PC1 to PCn ("Y" of step S22), a message that "the desired handling processing is rejected" is sent through the I/F 102 to the terminal used by the user to notify the user (step S23).

Then, the content of the handling processing selection information stored in the management table in the RAM 108 is read out, and the processing to be performed when the user desired handling processing is rejected (the processing previously selected by the user on the job cancel selection portion 22 shown in FIG. 6) is determined (step S24). When the user intends to cancel the print job ("Y" of step S25), the print job is canceled (step S26), and the process proceeds to step S27.

When the user intends not to cancel the print job, that is, intends to accept the setting of the system ("N" of step S25), the process proceeds directly to S27. At step S27, when the print job is canceled at step S26, the printer system 1 returns to the condition of before the print job is requested without performing printing after all, and the process returns to the handling processing selection processing shown in FIG. 3. When the print job is not canceled, after performing the handling processing chosen at step S16 or S18, the process returns to the handling processing selection processing shown in FIG. 3.

When it is determined at step S20 that no handling processing selection information accompanies ("N" of step S20), since it is unnecessary to perform the above-described processing to send a message and the like for the terminal on which handling processing selection information cannot be set, the process proceeds to step S27. When it is determined at step S21 that the common-to-system handling processing is not adopted, that is, that the user desired handling processing is adopted ("N" of step 521), since the user's intention is reflected finally, it is unnecessary to perform the above-described processing to send a message to the user and the like, and the process proceeds to step S27.

When it is determined at step S22 that the image data to be printed is not data sent from a terminal, that is, that the image data is data obtained by reading the image of the original by the scanner portion 4 of the printer 3 ("N" of step S22), a message that "the desired handling processing is rejected" is displayed on the display portion 83 of the operation panel 8 to notify the user (step S28), and the process proceeds to step S24.

As described above, in the handling processing selection processing, when the user desired handling processing and the common-to-system handling processing are referred to, in a case where they are the same, the processing is used as the processing to handle the abnormal condition, and in a case where they are not the same, the priorities previously assigned thereto are compared and the processing with the higher priority is used. Consequently, compared to the conventional case where the handling method is fixedly set, the abnormal condition can be handled with flexibility according to the use environment and the interests of the user requesting the print job and the other users can appropriately be coordinated, so that convenience increases. Further, since the user requesting a print job can previously select the processing to be performed when the handling processing desired by him is canceled, processing contrary to the user's intention is never performed.

(5) Modification

It is to be noted that the present invention is not limited to the above-described embodiment, and the following modifications can be considered:

(5-1) While in the embodiment, the processing performed when a "condition that paper of the requested size is not set" occurs as the abnormal condition is described as an example, the present invention is not limited thereto, and a case where paper runs out in the middle of printing may be set as the abnormal condition. In this case, processing similar to the above-described processing is performed from the point of time when it is detected that paper has run out.

Moreover, the abnormal condition and a plurality of processings to handle the abnormal condition may be set in accordance with the function of the printer and the content of the requested print job.

For example, (1) in a case where a condition that paper desired by the user is not set when each paper feed cassette holds paper of a different quality (for example, paper of a different thickness) is set as the abnormal condition, the handling processing shown in the embodiment can be adopted.

Moreover, (2) in a case where a condition that printing cannot be performed in a full color mode in a printer capable of printing in the full color mode is set as the abnormal condition, for example, "forcibly perform monochrome printing in black" or "defer printing until printing in the full color mode is enabled" can be used as the handling processing.

(5-2) While in the embodiment, the user performs an entry operation such as selection of the user desired handling processing every time printing is performed (a print job is requested), the setting content such as the user desired handling processing may be stored in a memory of each terminal so that the content is automatically read from the memory and sent together with the print data when a print job is requested. By doing this, it is unnecessary for the user to perform an entry operation every time printing is performed, so that the time and trouble to perform the entry operation can be saved.

(5-3) While in the embodiment, the processing to handle the abnormal condition is decided based on the priorities assigned to the common-to-system handling processing selected by the manager and the handling processings and the content of the user desired handling processing selected by the user, for example, the user desired handling processing may be used as the processing to handle the abnormal condition. Conventionally, the processing to handle the abnormal condition is fixedly set as mentioned above. For example, in a case where a processing such that when A4-size paper is not set, if B4-size paper is set, printing is forcibly performed on the B4-size paper is set as the handling processing, the abnormal condition can be handled only by the processing. According to this modification, however, the user can select the handling processing. Therefore, by the user who requests a print job selecting "3. Wait until paper of the specified size is set", for example, only when it is absolutely necessary for him to perform printing on A4-size paper, no inconvenience is caused to the other users, so that convenience is higher than before.

(5-4) While in the embodiment, the printer 3 has a function as a printer server accepting print jobs from the terminals PC1 to PCn and performs the handling processing selection processing when the image processing apparatus according to the present invention is applied to the printer system 1, for example, another terminal having a function as a printer server may be connected to the LAN 2 so that the terminal performs the handling processing selection processing. With this structure, a printer having neither a function as a printer server nor a function of performing the handling processing selection processing can be connected to the LAN 2. In this case, it is necessary that the terminal serving as the printer server can detect the abnormal condition of the printer and can control the operation of the printer based on the selected handling processing.

Moreover, the selection of the common-to-system handling processing and the assignment of priorities to the handling processings may be performed from this terminal by the manager. Further, this terminal may be used also as a terminal used by the users sharing the printer.

While an example in which the printer system 1 is taken as the image processing apparatus according to the present invention is described in the embodiment, since the printer 3 is capable of selecting the user desired handling processing and the operation to be performed when the selected handling processing is rejected as described above, the printer 3 alone can be taken as the image processing apparatus.

As described above, according to the embodiment, the processing to handle the abnormal condition can flexibly be selected from among a plurality of processings according to the environment in which the printer system is placed, and by performing the selected processing, the interests of the user requesting the print job and the other users can appropriately be coordinated compared to the conventional case where the handling method is fixedly set.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image processing apparatus that performs a predetermined processing in response to occurrence of an abnormal condition that an image forming job cannot be executed, the image processing apparatus comprising:
   a first setting unit for presetting a first processing for the apparatus as a common processing to respond to the abnormal condition;
   a second setting unit for setting a second processing for the image forming job as a processing to respond to the abnormal condition; and
   a priority assigning unit for assigning priorities to the first processing and the second processing.

2. An image processing apparatus as claimed in claim 1, further comprising:
   a selector for selecting either the first processing or the second processing based on the assigned priorities.

3. An image processing apparatus as claimed in claim 2, further comprising:
   a third setting unit for setting whether to cancel the image forming job or not when the second processing is not selected by the selector.

4. An image processing apparatus as claimed in claim 1, wherein said first setting unit or said second setting unit includes a display on which a plurality of processings are displayed as options, and a desired processing is selected from among the displayed processings to set the first processing or the second processing.

5. An image processing apparatus as claimed in claim 1, wherein said image processing apparatus includes an image forming apparatus that performs image formation on sheet in accordance with a request for an image forming job.

6. An image processing apparatus as claimed in claim 5, wherein said image processing apparatus includes a terminal that requests an image forming job of the image forming apparatus,
   wherein said second setting unit is provided in the terminal.

7. An image processing apparatus as claimed in claim 6, wherein said first processing or said second processing is to notify the terminal of the abnormal condition in response to occurrence of the abnormal condition.

8. An image processing apparatus as claimed in claim 5, wherein said image forming apparatus has a cassette holding sheet, and said abnormal condition is a condition that sheet of a size necessary for the image forming job is not set in the cassette.

9. An image processing apparatus as claimed in claim 8, wherein said first processing or said second processing is to change the paper size and continue the image forming job or to wait until paper of the necessary size is set in the cassette.

10. An image processing apparatus that performs a predetermined processing in response to occurrence of an abnormal condition that an image forming job cannot be executed, the image processing apparatus comprising:
    a first setting unit for setting a first processing for a first image forming job as a processing to respond to the abnormal condition;
    a second setting unit for setting a second processing different from the first processing for a second image forming job as a processing to respond to the abnormal condition; and
    a controller for performing the first processing when the abnormal condition occurs with respect to the first image forming job, and performing the second processing when the abnormal condition occurs with respect to the second image forming job.

11. An image processing apparatus as claimed in claim 10, wherein said first setting unit or said second setting unit includes a display on which a plurality of processings are displayed as options, and a desired processing is selected from among the displayed processings to set the first processing or the second processing.

12. An image processing apparatus as claimed in claim 10, wherein said image processing apparatus includes an image forming apparatus that performs image formation on sheet in accordance with a request for an image forming job.

13. An image processing apparatus as claimed in claim 12, wherein said image processing apparatus includes a terminal that requests an image forming job of the image forming apparatus,
    wherein said first setting unit or said second setting unit is provided in the terminal.

14. An image processing apparatus as claimed in claim 13, wherein said first processing or said second processing is to notify the terminal of the abnormal condition in response to occurrence of the abnormal condition.

15. An image processing apparatus as claimed in claim 12, wherein said image forming apparatus has a cassette holding sheet, and said abnormal condition is a condition that sheet of a size necessary for the image forming job is not set in the cassette.

16. An image processing apparatus as claimed in claim 15, wherein said first processing or said second processing is to change the paper size and continue the image forming job or to wait until paper of the necessary size is set in the cassette.

17. A method of controlling an image forming apparatus that performs a predetermined processing in response to occurrence of an abnormal condition that an image forming job cannot be executed comprising the steps of:

presetting a first processing for the apparatus as a common processing to respond to the abnormal condition;

a setting a second processing for the image forming job as a processing to respond to the abnormal condition;

selecting either the first processing or the second processing according to priorities assigned thereto; and performing the selected processing in response to occurrence of the abnormal condition when the abnormal condition occurs.

18. An image processing apparatus that performs predetermined processing in response to occurrence of an abnormal condition that inhibits execution of an image forming job, comprising:

a first unit for designating a common processing mode from among a plurality of available processing modes for responding to the abnormal condition;

a second unit for designating a job-specific processing mode from among said plurality of processing modes for responding to the abnormal condition; and a priority assigning unit for assigning priorities to the common processing mode and the job-specific processing mode.

19. A method for controlling an image-forming apparatus that performs predetermined processing in response to occurrence of an abnormal condition that inhibits execution of an image-forming job, comprising the steps of:

designating a common processing mode from among a plurality of available modes for responding to the abnormal condition;

designating a job-specific processing mode from among said plurality of modes for responding to the abnormal condition;

selecting either the common processing mode or the job-specific processing mode according to priorities assigned thereto; and performing the selected processing mode in response to occurrence of the abnormal condition.

* * * * *